July 8, 1969
P. J. CUNNINGHAM
3,454,167
COMBINED MOTION PICTURE PROJECTOR SUPPORT AND STRUCTURAL BRACE
Filed Feb. 1, 1967
Sheet 1 of 3
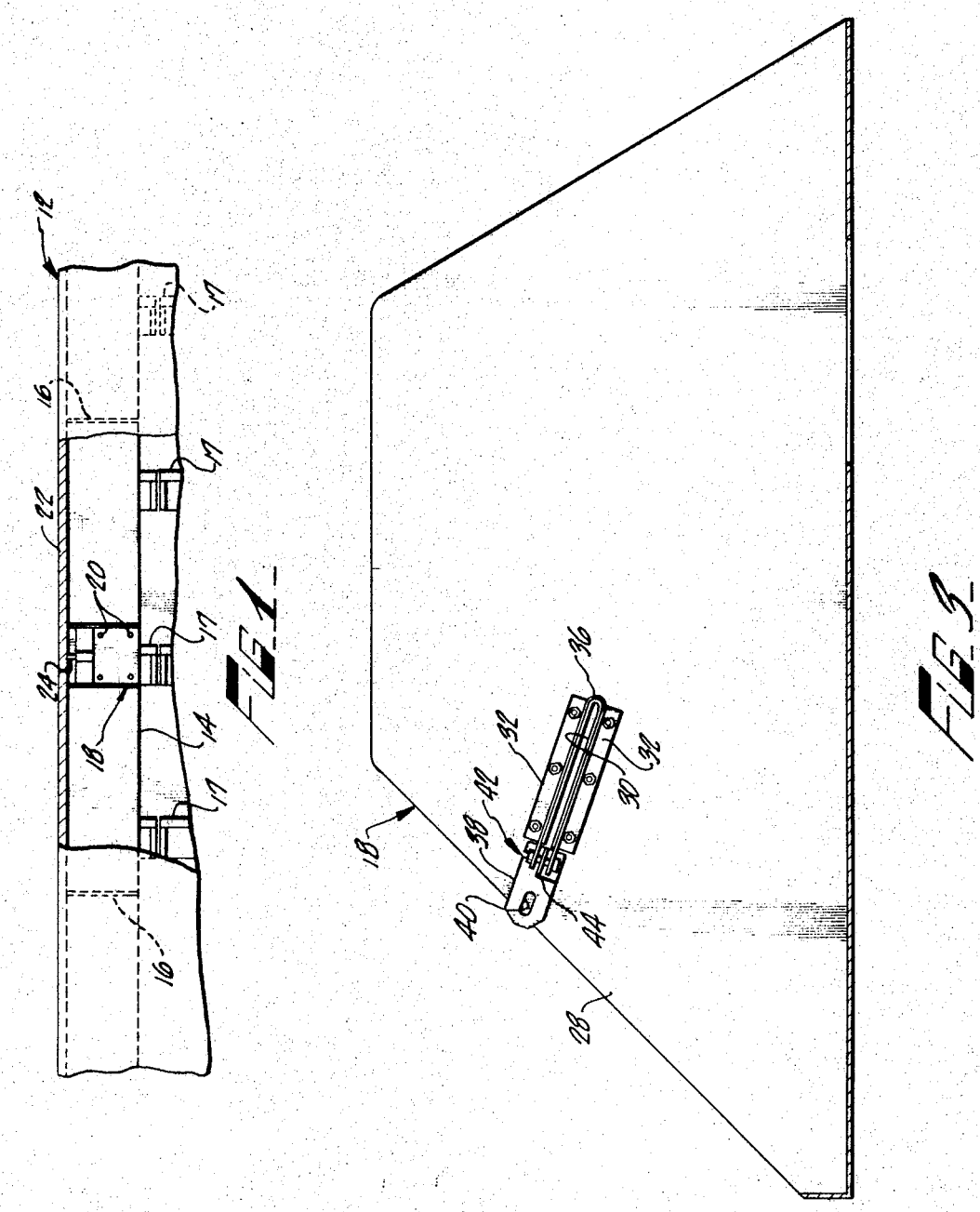
INVENTOR.
PATRICK J. CUNNINGHAM
BY
Christie, Parker & Hale
ATTORNEYS.

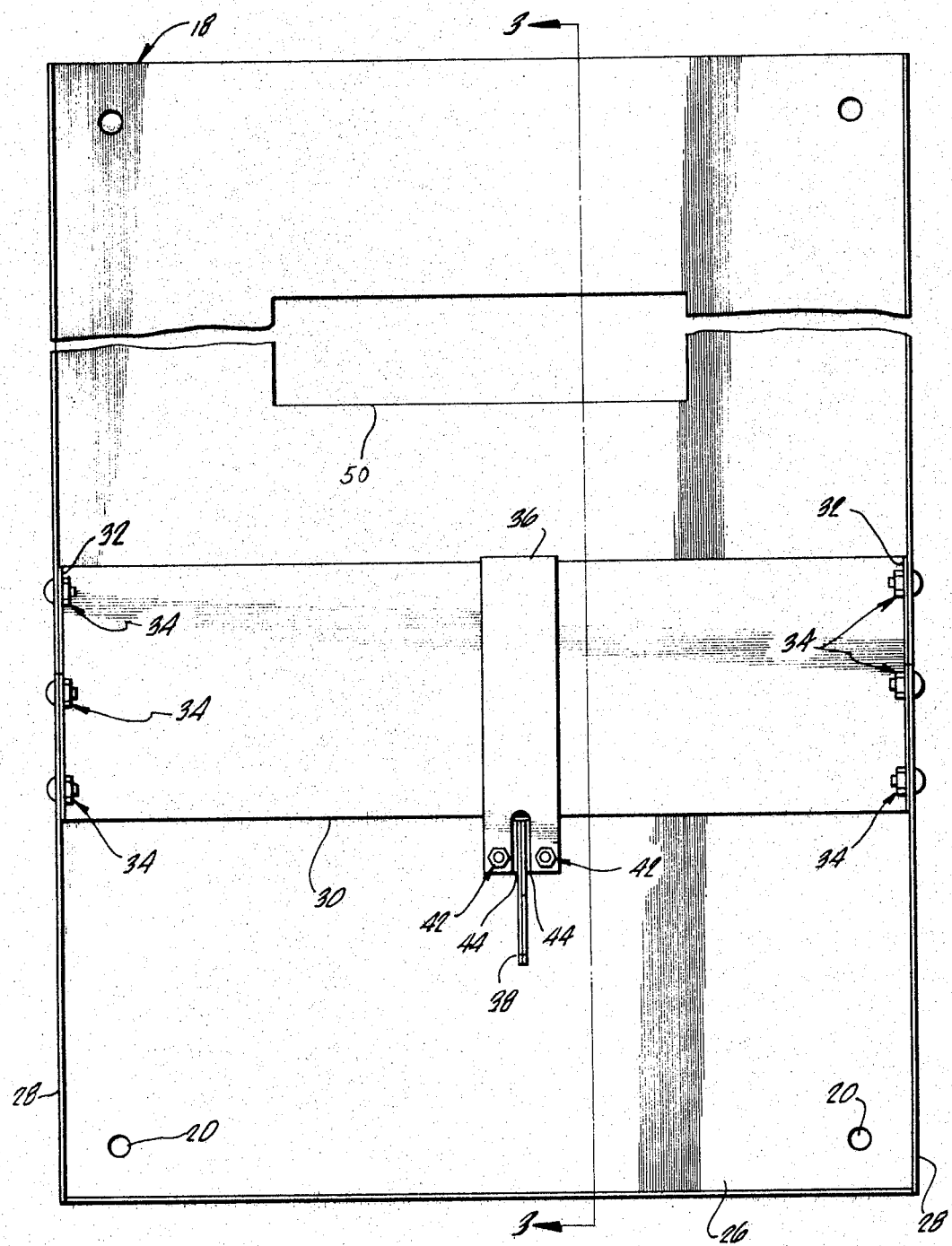

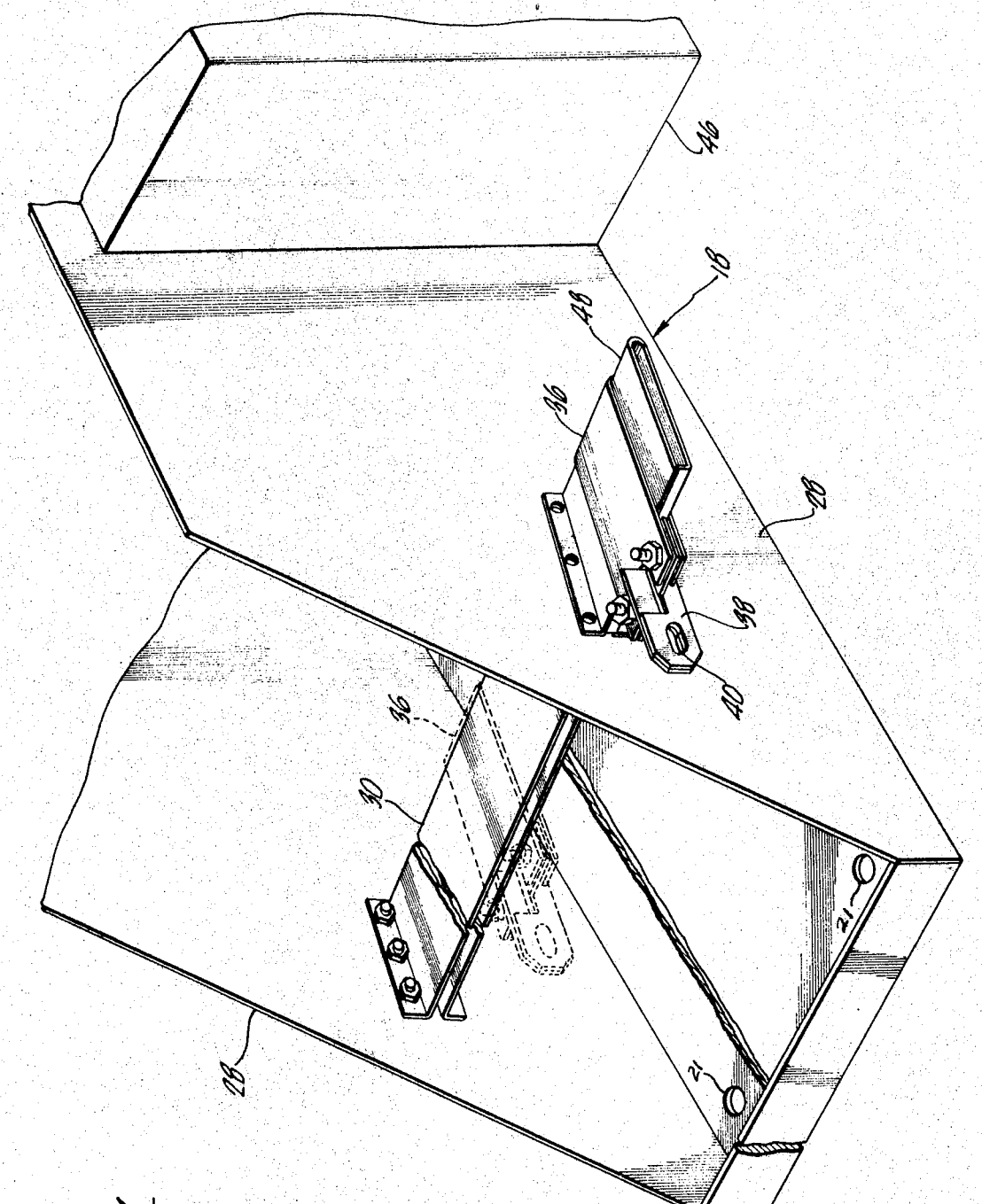

United States Patent Office 3,454,167
Patented July 8, 1969

3,454,167
COMBINED MOTION PICTURE PROJECTOR SUPPORT AND STRUCTURAL BRACE
Patrick J. Cunningham, Fullerton, Calif., assignor, by mesne assignments, to Bell & Howell Company, Chicago, Ill., a corporation of Illinois
Filed Feb. 1, 1967, Ser. No. 613,155
Int. Cl. A47f 5/08
U.S. Cl. 211—88          2 Claims

ABSTRACT OF THE DISCLOSURE

A pan-shaped receptacle particularly adapted for use in passenger aircraft. The pan performs a dual function of providing a platform for mounting a motion picture projector and at the same time providing structural support for the portion of the overhead rack in which the projector is mounted. The pan includes a bottom plate and at least two upright side walls. Several points for attaching the bottom plate of the pan to the rack are provided. In addition, a rigid bar or support running across the back of the pan interconnects the two side walls. A slidable bracket and clevis can be positioned at any point along the support for attachment to the cabin wall to replace the strut or brace normally extending from the cabin wall to the front edge of the rack. An extension of the rigid bar can be mounted on the external side of the pan walls in those instances where the plane of the brace is located closely adjacent to the exterior of the receptacle.

Background of the invention

This invention relates to an apparatus for supporting motion picture projectors and in particular to a receptacle for mounting such projectors in the overhead rack of a passenger aircraft.

In one type of entertainment system currently being offered for use in common carriers, such as the cabins of passenger aircraft, a plurality of motion picture projectors are placed in a rack located along the wall of the cabin above the rows of seats. This rack normally runs the length of the aircraft and is attached to the cabin wall along one edge. It is further supported by a plurality of braces located at spaced intervals along the length of the rack. These braces are typically attached to the aisle side of the overhead rack and extend generally upwardly to a point of attachment located above the rack on the interior wall of the aircraft cabin.

A typical complement of equipment for jet aircraft currently in use includes sixteen or seventeen motion picture projectors. Because the projection screens are normally located directly above the backs of the passenger seats to prevent any obstruction of passenger movement, it has been found that in certain instances the placement of these projectors coincides with the location of one of the braces supporting the rack. To allow placement of the screen in these locations it is desirable that the brace be eliminated. Removal of the brace without substitution of support by some other means, however, reduces the structural integrity of the overhead rack. This problem is further accentuated by the placement of a number of motion picture projectors in this rack, adding to the weight which must be supported.

Summary of the invention

The present invention provides a receptacle for an article which is adapted to substitute for a supporting brace for a shelf attached to a vertical support. The invention comprises a receptacle having a bottom and includes means for mounting the receptacle on the shelf. A pair of side walls attached to the bottom extend upwardly therefrom. A rigid bar placed at a location removed from the space to be occupied by the article and at the side of the receptacle adjacent the vertical support joins the side walls and is affixed at the ends thereof to the interior sides of said walls. Means are provided for connecting the bar to an attachment point on the vertical support whereby the receptacle provides a mounting for the article and structural support for the shelf on which the article and receptacle are disposed.

Description of the drawing

The preceding and other aspects of the invention will be better understood by reference to the following figures wherein:

FIG. 1 is a plan view of a section of an aircraft cabin showing a receptacle according to the present invention mounted in an overhead rack;

FIG. 2 is a plan view of a specific embodiment of such a receptacle;

FIG. 3 is a view taken along lines 3—3 of FIG. 2; and

FIG. 4 is a perspective view of the projector receptacle illustrating possible positions for an attachment bracket.

Description of the preferred embodiments

Referring now to FIG. 1, there is shown therein a portion of an enclosure 12 such as the passenger cabin of an aircraft. Running along the length of the enclosure is a rack 14 which is disposed above the rows of seats 17 for the passengers. This rack normally serves as a location for the storage of blankets, pillows and wearing apparel. As shown, the rack is supported by a number of braces 16 located at spaced intervals along its length.

In the cutaway portion of FIG. 1 is shown a projector receptacle 18 located in the position which would normally be occupied by one of the supporting braces for the rack. Receptacle 18 is attached to rack 14 by means of bolts 20 and is attached to the wall 22 of enclosure 12 by attachment means 24.

In FIG. 2 a specific embodiment of receptacle 18 is depicted. The receptacle comprises a bottom or base plate 26 and a pair of side walls 28 which extend vertically upward from base plate 26 and are integrally formed therewith. Located at spaced points in the base plate 26 are a plurality of bolt holes 21 for attaching the receptacle to the floor of the overhead rack and an aperture 50 for the passage of light from the projector. Extending between side walls 28 is a rigid bar or support 30 in the form of an elongated flat, hollow extrusion having flanges 32 at each end thereof. The flanges are perforated allowing for the attachment of the bar to the side walls 28 by means of bolt and screw combinations 34.

A selectively positionable bracket 36 is mounted on support 30. Bracket 36 is slidable to any point along the length of support 30 so as to locate a clevis 38 in position to be connected to an attachment point such as a wall mounted hook (not shown) extending from the aircraft cabin wall. Clevis 38 is provided with an eyelet 40 (see FIG. 3) for joinder of the clevis to the attachment point. When properly located bracket 36 is fixed in position by tightening bolt and screw combinations 42 to cause bracket 36 to simultaneously grip support 30 and extensions 44 from clevis 38.

Referring now to FIG. 4, there is shown an embodiment wherein the attaching bracket is mounted on the exterior of side wall 28. Such an arrangement is provided when some obstruction is located adjacent the receptacle in the path normally taken by a supporting brace. In the airline entertainment system previously referred to, such an obstruction is present in the form of a rectangular enclosure 46 which houses a mechanism for providing looping of film passing from a projector (not shown) mounted in receptacle 18 prior to its transmission to a subsequent projector location downstream. In the embodiment in FIG. 4, an extension 48 of support 30 is attached to side wall 28. A sliding bracket 36, similar to that shown in FIGS. 2 and 3, is then mounted on extension 48 and slidably located in position for attachment to the aircraft cabin wall as before. A clevis 38 provided with an eyelet 40 is attached to the bracket and extends away from the bracket to an attachment point (not shown) on a vertical support located at the rear of the receptacle.

Also shown in FIG. 4 is a ghosted illustration of bracket 36 as it is mounted on bar or support 30 interiorly of side walls 28.

In either of the two embodiments illustrated, the receptacle 18 has a dual function of providing a means for mounting a motion picture projector rigidly in position on an elevated shelf and at the same time providing a structural element for maintaining the bracing of the shelf on which the projector is mounted. This bracing effect is obtained by the structural continuity extending from the cabin wall through clevis 38, bracket 36, support 30 (or extension 48) and receptacle 18 to which support 30 is rigidly attached. In this way complete flexibility of placement of a projector can be obtained while maintaining the structural soundness of the shelf on which the projector and receptacle is placed.

I claim:

1. In a passenger aircraft having a rack disposed over a passenger seating area, the rack being supported by braces located at spaced intervals along the length of the rack, the braces extending from first attachment points on the wall of the aircraft cabin above the rack to second attachment points on the rack, the combination comprising:

a motion picture projector mounting receptacle disposed on said rack and located in the plane of one of said braces, the receptacle having a bottom plate and an aperture located in the bottom plate for the passage of light from the projector to the exterior of the receptacle, a pair of side plates extending vertically upward from said bottom plate, means for fixedly securing the receptacle to the rack, a rigid horizontal support affixed at the ends thereof to the interior sides of the plates for joining said pair of side plates, the support being located at a position intermediate the aircraft cabin wall and the space for location of the projector, a bracket mounted on and slidably positionable along the length of the rigid support, and a means attached to the bracket and extending to one of said first attachment points whereby when secured in position the receptacle provides a mounting for the projector and structural support for the rack.

2. Apparatus according to claim 1 including an extension of the rigid support mounted on the exterior side of one of the side plates of said receptacle and bracket means mounted on said support, said bracket means being selectively positionable along the length of said extension and including means for being fixedly secured to one of said first attachment points.

References Cited

UNITED STATES PATENTS

| | | | |
|---|---|---|---|
| 1,317,634 | 9/1919 | Mueller | 312—20 |
| 2,543,146 | 2/1951 | Bace. | |
| 2,719,691 | 10/1955 | Vance | 248—298 X |

ROY D. FRAZIER, Primary Examiner.

J. F. FOSS, Assistant Examiner.

U.S. Cl. X.R.

211—183; 244—1; 248—11; 312—40